United States Patent Office 3,367,797
Patented Feb. 6, 1968

3,367,797
HEAT SENSITIVE COPY-SHEET
David P. Sorensen, St. Paul, Minn., assignor to Minnesota Mining and Manufacturing Company, St. Paul, Minn., a corporation of Delaware
No Drawing. Filed Nov. 21, 1961, Ser. No. 154,074
9 Claims. (Cl. 117—36.8)

This invention relates to heat-sensitive copy-sheets useful in the copying of differentially radiation-absorptive graphic originals by a thermographic process involving brief exposure of the original to intense radiant energy while in heat-conductive contact with the copy-sheet. The invention is more specifically directed to copy-sheets in which the visible copy results from the formation of an azo dye, and particularly wherein the image areas thus formed are themselves preferentially absorptive of the heat-inducing radiation so that the copy containing such image areas may itself serve as a graphic original in the preparation of additional copies by the thermographic process.

The commercial preparation of azo dyes, by diazotization in cold acidic aqueous solution with nitrous acid of an aromatic amine and combination of the diazo compound with an azo coupler component, is well known. Dyes of almost any desired color may be obtained, including deep lustrous blue-black shades well adapted to the production of visible images. However the reactants cannot easily be incorporated in copy-sheet structures in a form permitting a useful degree of stability under storage conditions together with the required rapid reactivity at temperatures within the approximate range of 90–150° C. normally provided in the thermographic process.

The present invention makes available a heat-sensitive copy-sheet which is capable of being converted to visibly distinct appearance by localized heating to temperatures within the approximate range of 90–150° C., e.g. by brief contact with a heated test bar or, more particularly, in the thermographic copying process, by employing azo-dye-forming reactant systems consisting essentially of N-nitrosamine, aromatic amine, and azo dye coupler component, all as will be hereinafter more fully defined and described.

A particularly important feature of many of the copy-sheets of this invention lies in their behavior when stored under conditions of high humidity. Rather than undergoing partial reaction and over-all darkening, with resultant reduction in contrast between background areas and heat-reacted image areas, as might be anticipated with such reactant systems, these humidified copy-sheets remain visually unaffected but are apparently chemically altered or activated in a manner which then results in the formation, under the influence of localized heating, of unusually dark-colored and high contrast image areas.

The reactant materials are conveniently mixed together in finely dispersed form in a solution of a film-forming resinous or polymeric binder and coated on a thin paper-like carrier sheet, followed by drying. Alternatively, the several reactants are coated independently or in any desired combination in two or more layers, preferably employing mutually immiscible binders or binder solutions. The binder in larger amount may itself serve as the carrier sheet or film where extreme thinness of copy-sheet is desired, or may be reduced to a minimum consistent with retention of the reactants and other components on a separate carrier. Pigments, plasticizers, and other additives may be included to provide improved color or handling characteristics or for other purposes.

Coating the N-nitroso and coupler compounds on an image sheet and the amine on a separate printing sheet, and employing the two sheets in face-to-face relationship as a heat-sensitive copy-sheet product, makes possible the production of permanent copy on the heat-stable image sheet, the printing sheet being removed after the image is formed.

Aromatic N-nitroso compounds, such for example as N-nitrosodiphenylamine and N-nitrosophenylbenzylamine are particularly useful in the practice of the invention. Other equivalent compounds having other aromatic or substituted aromatic groups attached to the N-nitroso group are also useful. The rate of reactivity of the copy-sheet appears to be intimately related to the rate of thermal decomposition of the N-nitroso compound, which in turn is influenced by the substituent groups. For example, N-nitroso-4,4'-dinitrodiphenylamine undergoes extremely rapid decomposition as compared with N-nitrosophenyl-4-nitrophenylamine which in turn reacts more rapidly than the unsubstituted N-nitrosodiphenylamine. The compound N-nitrosophenylbenzylamine also has a higher rate of thermal decomposition, and produces a more rapidly heat-marking copy-sheet, than does the N-nitrosodiphenylamine under otherwise identical circumstances. Colorless or not more than faintly colored compounds facilitate the preparation of essentially colorless copy-sheet products and are preferred.

As useful aromatic primary or secondary amines may be mentioned: aniline; p-aminoacetanilide; p-aminodiphenylamine; o-phenylene diamine; p-phenylene diamine; p-acetamido benzene diazonium tetrafluoroborate; p-acetamido diphenylamine; acetanilide; p-bromoaniline; p-toluidine; p-aminobenzoic acid; diphenylamine; and o-phenyl aniline. Of these, the preferred solid non-tertiary aromatic amines are relatively stable under normal room conditions and are essentially colorless or only faintly colored. In each case a specific amine is selected which in conjunction with the other reactants will provide an azo dye of desired color. Since some amines are subject to slow darkening or discoloration on continued exposure to ultraviolet radiation, the copy-sheets will usually be preserved under dark conditions; or it may be found desirable to provide on the copy-sheet a protective surface coating capable of absorbing the actinic radiation. In any event, the copy produced by localized heating is ordinarily amply stable to permit its effective use as temporary or disposable secondary graphic "original" for producing further copies by the thermographic copying process.

Although aromatic amine compounds and active methylene compounds known to be useful as azo coupling components are also applicable in the preparation of these copy-sheet materials in many instances, it is preferred to employ the more strongly reactive aromatic hydroxy azo couplers, particularly the aryl amides of 3-hydroxy-2-naphthoic acid known commercially as the "Naphtol AS" series of azo couplers, of which "Naphtol ASSW," 3-hydroxy-N-2-naphthyl-2-naphthamide, is illustrative. Another useful type of azo coupler is illustrated by 2,3-dihydroxynaphthalene.

The invention will now be further described and illustrated by means of the following specific but non-limiting examples, in which proportions are given in parts by weight unless otherwise noted.

*Example 1*

Map overlay tracing paper is provided with a first coating of 1.71 parts of "Naphthol ASSW" azo coupler and 1.08 parts of p-aminodiphenylamine in 100 parts of a 20% solution of vinyl acetate-chloride copolymer in acetone, applied by means of a coating bar at an orifice setting of 2 mils (.002 inch), and dried. A second coating is then similarly applied of a solution of one part N-nitrosodiphenylamine in 100 parts of a 10% solution of polyvinyl butyral in alcohol. The sheet is essentially colorless. As first prepared, the sheet converts to a blue-black color when locally briefly heated under near maximum irradiation in a commercial "Thermo-Fax" brand "Secretary" thermocopying machine or by brief contact with a metal test bar at a temperature of about 150–160° C. Copy thus prepared may be re-copied on commercial "Thermo-Fax" Type 12 heat-sensitive copy-paper by the thermographic process at somewhat lower energy input without making any observable change in the intermediate copy.

Copy-sheets prepared as above-described are wrapped and held in storage for a period of two weeks under normal office conditions of temperature and humidity, and are then tested as before in the thermographic copying process. Under the same near-maximum irradiation a more intense black image color is developed, with no change in background appearance.

A sheet having improved background appearance is produced by applying the second coating of the foregoing example as a first coat, and employing as the top coat the first-coat composition of the example to which has been added 12.5 parts of titanium dioxide pigment. The resulting sheet has a clean white appearance and produces a dark blue-black image on local heating at near maximum thermocopying temperature.

Example 2

A coating composition is prepared of the following:

| | Parts |
|---|---|
| "Naphtol ASSW" azo coupler | 1.71 |
| N-nitrosodiphenylamine | 1.08 |
| Aniline | 0.59 |
| Vinyl acetate-chloride copolymer (Vinylite VYHH) | 20 |
| Acetone | 80 |

The composition is smoothly spread on map overlay tracing paper at a coating thickness of 2 mils, and carefully dried. The sheet is essentially colorless. It converts to a red color on brief heating to about 150–160° C., e.g. in the thermographic copying process. The image is not sufficiently absorptive of infra-red to provide on irradiation therewith a heat-image adequate to form further copies on heat-sensitive copy-paper in the thermographic copying process.

Example 3

One mil Mylar tensilized polyester film is coated at a thickness of three mils with a composition containing 1.08 parts of p-aminodiphenylamine in 100 parts of a 10% solution of polyvinyl butyral in alcohol, and dried, to form a transparent printing sheet. A complementary image sheet is prepared by applying to a paper backing a three-mil coating of a mixture of 1.71 parts of Naphtol ASSW azo coupler, 1.0 part of N-nitrosodiphenylamine, and 12.5 parts of titanium dioxide smoothly dispersed in 85 parts of a 20% solution of Vinylite VYHH vinyl copolymer in acetone, followed by drying. The two sheets are placed in face-to-face contact and serve as a heat-sensitive copy-sheet product for making a copy of a thin graphic original by the thermographic back-printing process in which the heat pattern, established at the exposed printed surface of the original by brief intense irradiation, is transmitted through the original to the sensitive sheet product. The blue image areas are directly visible through the transparent printing sheet; or the latter may be removed, the image sheet then retaining a permanent and heat-stable copy. Additional copy may be imparted to the image sheet in the same or different image colors as desired, by repeating the copy process using other originals and other printing sheets. As an example, a printing sheet containing an equivalent amount of o-phenylaniline in place of the p-aminodiphenylamine of the sheet above described imparts a red rather than a blue color to the image sheet at the heated image areas.

In the above example, the color is produced almost exclusively in the image sheet when the latter contains a significant amount of $TiO_2$ or other equivalent pigment such as zinc oxide. In the absence of the pigment, the color appears on both the image sheet and the printing sheet.

Additional examples of other combinations of reactants are provided for convenience in tabular form. It will be understood that these reactants may be incorporated in any of the types of copy-sheet structures hereinbefore described. The reactants of the first three examples are also included for convenient reference.

| Ex. | N-nitroso | Amine | Coupler | Image | IR |
|---|---|---|---|---|---|
| 1 | NDPA | ADPA | ASSW | Blue-black | + |
| 2 | NDPA | Aniline | ASSW | Red | − |
| 3 | NDPA | o-Phenylaniline | ASSW | Red | |
| 4 | NPBA | ADPA | ASSW | Black | + |
| 5 | NDPA | p-Aminoacetanilide | ASSW | Purple-red | + |
| 6 | NDPA | o-Phenylene diamine | ASSW | ----do---- | − |
| 7 | NDPA | p-Phenylene diamine | ASSW | Purple | |
| 8 | NDPA | ADPA | DHN | ----do---- | + |
| 9 | NDPA | p-Aminoacetanilide | DHN | Red | + |
| 10 | NDPA | p-Phenylene diamine | DHN | Purple-red | |
| 11 | NDPA | Phenylene diamine | DHN | ----do---- | |
| 12 | NDPA | p-Bromoaniline | DHN | Orange | |
| 13 | NDPA | p-Toluidine | DHN | ----do---- | |
| 14 | NDPA | ADPA | DHDP | Brown-black | + |

Key: NDPA=N-nitrosodiphenylamine; ADPA=p-aminodiphenylamine; ASSW="Naphtol ASSW"; NPBA=N-nitrosophenylbenzylamine; DHN=2,3-dihydroxynaphthlene; DHDP=4,4'-dihydroxydiphenyl; IR=image preferentially radiation-absorptive.

What is claimed is as follows:

1. A heat-sensitive copy-sheet product including a visibly heat-sensitive layer containing, in intimate uniform juxtaposition, reactants comprising N-nitrosodiphenylamine and a solid non-tertiary aromatic amine, and as a further reactant, an aromatic hydroxy azo coupler component.

2. A heat-sensitive copy-sheet product comprising a paper-like backing and a visibly heat-sensitive layer bonded thereto and comprising, in intimate uniform juxtaposition, reactants comprising N-nitrosodiphenylamine and a solid non-tertiary phenylamine, and aromatic hydroxy azo coupler.

3. A heat-sensitive copy-sheet product comprising, in face-to-face contact, (1) a printing sheet consisting essentially of a paper-like backing and a surface coating containing a solid non-tertiary phenylamine, and (2) an image sheet consisting essentially of a paper-like backing and a surface coating containing N-nitrosodiphenylamine and an aromatic hydroxy azo coupler.

4. For use in conjunction with an amine-containing printing sheet in providing a heat-sensitive copy-sheet product as described in claim 3, an image sheet consisting essentially of a paper-like backing and a surface coating containing N-nitrosodiphenylamine, an aromatic hydroxy azo coupler component, and a white pigment.

5. A heat-sensitive copy-sheet product which on brief localized heating is converted at the heated areas to a visibly distinct and preferentially infra-red-absorptive image, said copy-sheet product including a heat-sensitive layer containing, in intimate uniform juxtaposition in a retaining polymeric film-forming binder, N-nitrosodiphenylamine, hydroxy aromatic azo coupler, and p-aminodiphenylamine.

6. A heat-sensitive copy-sheet product which on brief localized heating is converted at the heated areas to a visibly distinct and preferentially infra-red-absorptive image, said copy-sheet product including a heat-sensitive layer containing, in intimate uniform juxtaposition in a retaining polymeric film-forming binder, N-nitrosodiphenylamine, hydroxy aromatic azo coupler, and p-aminoacetanilide.

7. A heat-sensitive copy-sheet product visibly stable against storage at high humidity and useful in making copies of graphic originals by the thermographic copying process, said product including a visibly heat-sensitive layer containing, in intimate uniform juxtaposition and retained in polymeric film-forming binder, N-nitrosodiphenylamine, p - aminodiphenylamine, and 3 - hydroxy-N-2-naphthyl-2-naphthamide.

8. A heat-sensitive copy-sheet product visibly stable against storage at high humidity and useful in making copies of graphic originals by the thermographic copying process, said product including a visibly heat-sensitive layer containing, in intimate uniform juxtaposition and retained in polymeric film-forming binder, N-nitrosodiphenylamine, a primary aromatic amine, and 3-hydroxy-N-2-naphthyl-2-naphthamide.

9. A heat-sensitive copy-sheet product visibly stable against storage at high humidity and useful in making copies of graphic originals by the thermographic copying process, said product including a visibly heat-sensitive layer containing, in intimate uniform juxtaposition and retained in polymeric film-forming binder, N-nitrosodiphenylamine, a primary aromatic amine, and 2,3-dihydroxynaphthalene.

References Cited
UNITED STATES PATENTS

| | | | |
|---|---|---|---|
| 3,097,297 | 7/1963 | Sahler | 117—36.8 |
| 2,306,471 | 12/1942 | Solomon | 96—91 X |
| 2,411,811 | 11/1946 | Sargent | 96—90 X |
| 2,419,296 | 4/1947 | Solomon | 96—91 X |
| 2,950,213 | 8/1960 | Streck | 117—36.2 |
| 2,967,784 | 1/1961 | Newman | 117—36.8 |
| 2,873,671 | 2/1959 | Florence | 117—36.2 |
| 2,995,465 | 8/1961 | Richey | 117—36.8 |
| 2,995,466 | 8/1961 | Sorensen | 117—36.8 |

MURRAY KATZ, *Primary Examiner.*
WILLIAM D. MARTIN, *Examiner.*